US005497801A

United States Patent [19]

Kusunose et al.

[11] Patent Number: 5,497,801

[45] Date of Patent: Mar. 12, 1996

[54] FLOW CONTROL VALVE

[75] Inventors: Masashi Kusunose, Nagasaki; Shoji Mitsui, Yokohama; Hiroei Yanagino, Yokohama; Chiyuki Sawashima, Yokohama, all of Japan

[73] Assignee: Mitsubishi Jukogyo Kabushiki Kaisha, Tokyo, Japan

[21] Appl. No.: 302,985

[22] Filed: Sep. 12, 1994

[30] Foreign Application Priority Data

Sep. 14, 1993 [JP] Japan .................................... 5-250980

[51] Int. Cl.[6] ...................................................... G05D 7/01

[52] U.S. Cl. ........................... 137/117; 251/121; 251/127

[58] Field of Search .................................... 137/115, 116, 137/117; 251/121, 127

[56] References Cited

U.S. PATENT DOCUMENTS

| | | | |
|---|---|---|---|
| 4,019,527 | 4/1977 | Brand | 137/115 |
| 4,095,611 | 6/1978 | Hetz | 137/115 |
| 4,634,095 | 1/9187 | Taylor | 251/127 X |
| 4,858,515 | 8/1989 | Karlberg | 251/121 X |
| 4,967,783 | 11/1990 | Loos | 137/116 |

FOREIGN PATENT DOCUMENTS

| | | |
|---|---|---|
| 053290 | 6/1982 | European Pat. Off. . |
| 1266512 | 3/1972 | United Kingdom . |
| 88/2831 | 4/1988 | WIPO . |

*Primary Examiner*—Stephen M. Hepperle

*Attorney, Agent, or Firm*—Wenderoth, Lind & Ponack

[57] ABSTRACT

A flow control valve having a bypass valve section that opens when a main valve section has approached a closed state has a bypass start point that can be easily varied and adjusted, even after installation of the flow control valve. Further, cavitation is not generated in the valve. The flow control valve comprises a cylindrical body having a bypass valve seat and a plurality of protrusions on an inner peripheral surface to form bypass flow passages therebetween. A bypass opening and closing body has a bypass valve element formed at its front end portion and a plurality of slit holes formed on its outer peripheral surface so as to open and close the bypass flow passages between the respective protrusions, and is disposed in an axially movable manner. A piston is disposed in an axially movable manner in the bypass opening and closing body and has an enlarged outer diameter section formed on its rear portion and a communication hole penetrating therethrough in the axial direction. An adjusting member has a rear end portion of the piston fitted therein and is formed in such a manner that a resistance may be applied to the flow of fluid into a control chamber depending upon a fitting depth of the piston. An adjusting bolt variably sets the position of the adjusting member in the axial direction.

8 Claims, 5 Drawing Sheets

FLOW CONTROL VALVE

BACKGROUND OF THE INVENTION

1. Field of the Invention

The present invention relates to a flow control valve adapted to maintain a minimum flow rate by bypassing fluid for the purpose of preventing overheating or other hazards of a pump when a flow rate is small.

2. Description of the Prior Art

One example of a flow control valve in the prior art is shown in FIG. 5. A valve box 10 opens at an inlet 1*i*, an outlet lo and a bypass outlet 1*b*. Within the valve box 10 is provided a main valve element 20 pressed against a main valve seat 1*s* by means of a spring 30, and a bypass opening/closing body 50 connected to the main valve element 20 is supported in an axially movable manner. In the bypass opening/closing body 50 are formed a hollow space portion 5*a* and an elongated hole 5*c*. When a demand flow rate on a load side is large, the pressure of fluid entering through the inlet 1*i* into the valve box 10 pushes the main valve element 20 rightwards as viewed in FIG. 5 from the main valve seat 1*s* to open the main valve element 20, and thereby the fluid flows out from the outlet 1*o* to the load through a gap clearance formed around the main valve body 20. At this time, the bypass opening/closing body 50 moves rightwards as viewed in FIG. 5 jointly with the main valve element 20, and the elongated hole 5*c* is held at a position where it comes into contact with an inner surface of a guide member 19. Hence, the fluid entering into the hollow space portion 5*a* has no path for communicating with the bypass outlet 1*b*, and the bypass flow rate is nearly zero. If the load flow rate has reduced, since the main valve element 20 approaches to the main valve seat 1*s*, being pushed leftwards in FIG. 5 by the spring 30, the bypass opening/closing body 50 also moves leftwards jointly with the main valve element 20, and the elongated hole 5*c* comes to the position where it communicates with the bypass outlet 1*b*. The fluid entering through the inlet 1*i* then flows from the hollow space portion 5*a* through the elongated hole 5*c* and escapes from the bypass outlet 1*b*. This bypass flow rate is preset as shown in FIG. 6(B) so that a minimum flow rate can be maintained for the purpose of preventing overheating or other hazards of a pump when the flow rate is small.

However, in the case of the above-described flow control valve in the prior art, depending upon the position of the main valve element 20, the position of the bypass opening/closing body 50 is determined, and hence the bypass flow rate is also definitely decided. Accordingly, in the event that it is desired to change the bypass start point and the like after this heretofore known flow control valve has been assembled in a plant or the like, it is impossible to change and adjust it unless the control valve is disassembled. In addition, in the case where the fluid is high-pressure hot water, there is a problem in that due to a large pressure difference of the pressure reduction at the elongated hole 5*c*, cavitations arise, erosion is generated in the proximity of the elongated hole 5*a*, resulting in a change of the shape of the elongated hole 5*c*, and therefore bypass characteristics change.

SUMMARY OF THE INVENTION

It is therefore a principal object of the present invention to provide an improved flow control valve which is free from the above-mentioned shortcomings of the flow control valve in the prior art.

A more specific object of the present invention is to provide a flow control valve in which a bypass start point and the like can be easily changed and adjusted even after the flow control valve has been assembled in a plant or the like, and there is no fear of generating cavitation.

According to one feature of the present invention, there is provided a flow control valve of the type where a bypass valve section opens when a main valve section has approached a closed state. The valve comprises a cylindrical body having a bypass valve seat mounted at the bypass valve section and a plurality of protrusions on its inner peripheral surface to form bypass flow passage therebetween. A bypass opening and closing body has a bypass valve element adapted to butt against the above-mentioned bypass valve seat formed at its front end portion, and has a plurality of slit holes formed on its outer peripheral surface so as to open and close the bypass flow passages between the respective protrusions of the above-mentioned cylindrical body simultaneously with the opening and closing of the aforementioned bypass valve element. It also has an enlarged outer diameter section that comes into contact with the inner peripheral surface of the cylindrical body at its rear end portion, and is disposed in an axially movable manner. A piston is disposed in an axially movable manner, penetrating through the above-mentioned bypass opening and closing body, and has an enlarged diameter section formed on its rear portion and has a communication hole penetrating therethrough in the axial direction. An adjusting member has a rear end portion of the above-mentioned piston fitted therein and is formed in such manner that a resistance may be applied to the flow of fluid between the communication holes in the above-mentioned piston and a control chamber formed behind the above-mentioned bypass opening and closing body, depending upon a fitting depth of the rear end portion of the piston. An adjustment setting means variably sets the position in the axial direction of the above-mentioned adjusting member.

According to another feature of the present invention, there is provided the above-featured flow control valve wherein a collar forming the above-mentioned slit holes is mounted to the aforementioned bypass valve element.

According to still another feature of the present invention, there is provided the first-featured flow control valve wherein a stopper for adjustably restraining a full open position of the aforementioned bypass opening and closing body is provided.

In the above-described flow control valve according to the present invention, when a main valve element occupies an opening position of a larger degree of opening than a predetermined opening position, although a piston and a bypass opening and closing body are free because the piston is apart from the main valve element, since a fluid pressure acts upon the rear end surfaces of the enlarged outer diameter sections of the piston and the bypass opening and closing body having larger areas than their front end surfaces through the communication hole penetrating through the piston, the piston and the bypass opening and closing body move forward, as pushed by the fluid pressure. Hence the bypass valve element butts against the bypass valve seat, and the bypass flow rate becomes zero. When the main valve element has come to an opening position of a smaller degree of opening than the predetermined opening position, the main valve element butts against the piston and depresses the latter, and so a fitting depth of the rear end portion of the piston in the adjusting member becomes large. Then, since the flow resistance of fluid between the communication hole in the piston and the control chamber behind the bypass opening and closing body is increased, the bypass opening and closing body would move backwards so as to balance by increasing the flow resistance of fluid flowing out from the control chamber. Hence the bypass valve element separates from the bypass valve seat by the corresponding amount, and a bypass flow is produced at the corresponding bypass flow rate. Because of the fact that the bypass flow passages formed between the plurality of protrusions on the cylindrical body are opened and closed by the split holes in the bypass opening and closing body simultaneously with opening and closing of the bypass valve element, the fluid flowing into the bypass would be stepwisely reduced in pressure at the location of the respective slits. Hence a pressure difference at the time of pressure reduction becomes small, and cavitations are hardly generated. If the position of the adjusting member in the axial direction is variably set by the adjustment setting means, then a fitting depth of the piston into the adjusting member would change, thus an inflow resistance of fluid into the control chamber changes, the bypass opening and closing body moves up to the position where a balance is established, and the bypass flow rate is variably set.

If there is provided a stopper for adjustably restraining a full open position of the bypass opening and closing body, a bypass flow rate under a fully opened state can be adjustably restrained.

BRIEF DESCRIPTION OF THE DRAWINGS

The above-mentioned and other objects, features and advantages of the present invention will become more apparent by reference to the following description of one preferred embodiment of the invention taken in conjunction with the accompanying drawings, in which.

DESCRIPTION OF THE PREFERRED EMBODIMENT

In the following, one preferred embodiment of the present invention will be described with reference to FIGS. 1, which shows a vertical cross-sectional view of a general structure of a flow control valve according to one preferred embodiment of the present invention in FIG. 1(A) and a vertical cross-sectional view of a bypass valve section of the same control valve at FIG. 1(B).

Figure 1A:
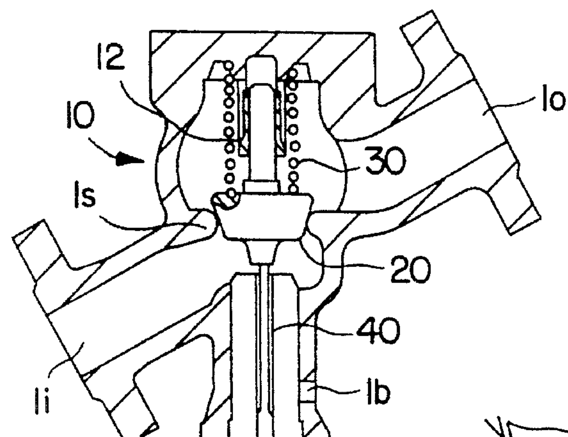
FIGS. 1(A) and 1(B) show a flow control valve according to one preferred embodiment of the present invention, with a general vertical cross-sectional view of the flow control valve being shown at FIG. 1(A) and a vertical cross-sectional view of a bypass valve section in the same flow control valve being shown at FIG. 1(B)

In FIG. 1(A), reference numeral 10 designates a valve box, and in the valve box 10 are formed necessary fluid passages, including an inlet 1*i*, an outlet 1*o*, a bypass outlet 1*b* and a main valve seat 1*s*. To the inlet 1*i* is connected a delivery piping system of a fluid pressure source, such as a water feed pump or the like (not shown). To the outlet 1*o* is connected a load piping system, such as a boiler water feeder or the like (not shown). To the bypass outlet 1*b* is connected a return piping system for returning the water of the bypass flow to a water feed tank or the like (not shown). Reference numeral 20 designates a main valve element, which is disposed in an axially movable manner with its valve spindle supported by a main valve bearing 12 so that it can open and close the main flow passage by butting against a main valve seat 1*s* within the valve box 10. Reference numeral 30 designates a compression spring, which is disposed so as to press the main valve element 20 to the main valve seat 1*s* with a predetermined elastic restoring force. Reference numeral 40 designates a piston in the bypass valve section, which is a primary member of a mechanism for opening a bypass flow passage to the bypass outlet 1*b* as pressed by the main valve element 20 under a state close to a closed state of the main valve element 20.

Figure 1B:
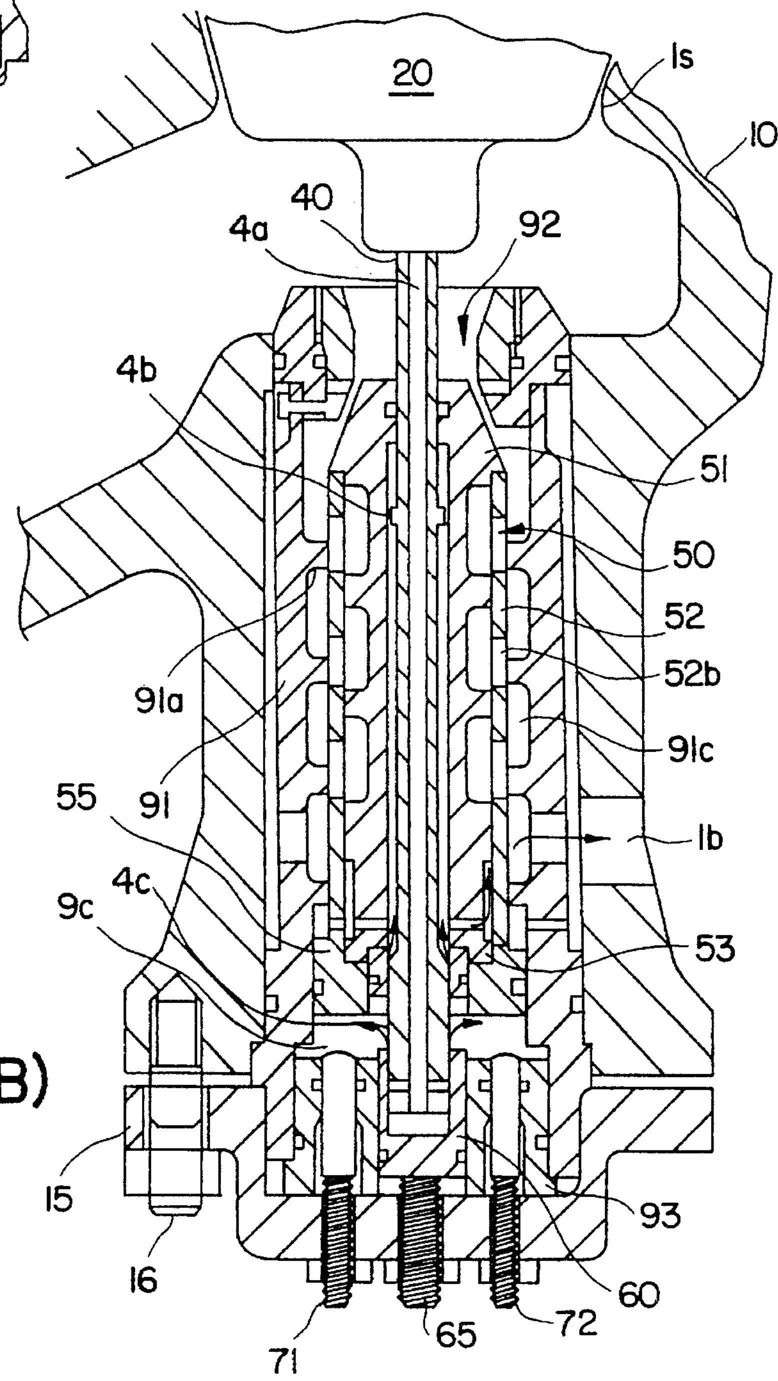

As shown in FIG. 1(B), the piston 40 is positioned on a center line of the bypass valve section, and outside of the piston 40 is a bypass opening and closing body 50. Within the valve box 10 in the bypass valve section is fixedly provided a cylindrical body 91, and a bypass valve seat 92 is fixedly provided in the upper portion of FIG. 1(B). Also, in the lower portion of the same figure is provided an adjusting member 60 supported by an adjusting member support 93 in an axially movable manner. By mounting a lid 15 with mounting bolts 16 after the above-mentioned members have been inserted into the valve box 10 from below as viewed in the same figure, the cylindrical body 91, the bypass valve seat 92 and the adjusting member support 93 are fixedly secured to the valve box 10, while the bypass opening and closing body 50 and the piston 40 are disposed in an axially movable manner.

As shown in FIG. 1(B), the bypass valve seat 92 is provided at the inlet of the bypass valve section (at the upper portion in FIG. 1(B)), and the lower portion of the bypass valve seat 92, as viewed in the same figure, is shaped as a valve seat having a conical surface. The cylindrical body 91 has its front end portion fixedly secured to a rear portion of the bypass valve seat 92, and the cylindrical body 91 and bypass valve seat 92 are fixed to the valve box 10 by fastening the lid 15 via the adjusting member support 93 by means of the mounting bolts 16. On the inner peripheral surface of the cylindrical body 91 are formed a plurality (3 or 4 in the figure) of annular protrusions 91*a*, and between the respective protrusions 91*a* are respectively formed bypass flow passages 91*c*. The inner peripheral surfaces of the respective protrusions 91*a* are precisely finished to have the same diameter so that they can smoothly slide along an outer peripheral surface of a collar 52, which will be described later. The positions of the respective protrusions are determined in relation to the positions of slit holes 52*b* in the collar 52 so that a predetermined equal degree of opening may be obtained at the locations of the respective protrusions 91*a* under a given condition. From the bypass flow passage 91*c* between the rearmost two protrusions 91*a* is formed a fluid flow passage communicating with the bypass outlet 1*b*.

As shown in FIG. 1(B), the bypass opening and closing body 50 for supporting the piston 40, penetrating along the center line in an axially movable manner, is provided inside of the cylindrical body 91, also in an axially movable manner. The bypass opening and closing body is an integral assembly of a bypass valve element 51, the collar 52, a piston receiving member 53 and an enlarged outer diameter portion 55. The front end portion of the bypass valve element 51 is formed in a conical shape that can be brought into tight contact with the conical valve seat portion of the bypass valve seat 92. Also, on the outer peripheral surface of the bypass valve element 51 are formed a plurality of annular recesses and protrusions so as to respectively oppose to the protrusions 91*a* on the inner peripheral surface of the cylindrical body 91 and the recesses 91*c* therebetween, and these recesses form a bypass flow passage jointly with the bypass flow passages 91*c* that consist of the recesses between the respective protrusions 91*a* on the cylindrical body 91. The collar 52 is of a circular tube shape. The inner surface of the collar 52 is formed so as to be brought into tight contact with the respective annular protrusions of the bypass valve element 51, and the outer surface of the collar 52 is formed so as to smoothly slide along the respective protrusions 91*a* of the cylindrical body 91. Slit holes 52*b* are formed in the collar 52 so as to open or close the communication between the bypass flow passages 91*c* between the respective protrusions 91*a* of the cylindrical body 91 and the respective annular recesses on the bypass valve element 51, and so as to allow communication at a predetermined degree of opening under a given condition. The bypass valve section is formed and assembled in such manner that the opening or closing and the degree of opening of the bypass flow passages 91*c* by means of the respective slit holes 52*b* may always be identical to the opening or closing and the degree of opening of the flow passage between the front end portion of the bypass valve element 51 and the bypass valve seat 92.

In addition, to the rear end portion of the bypass valve element 51 are fixedly secured a piston receiving member 53 and an enlarged outer diameter portion 55. The inner circumference of the rear portion of the cylindrical body 91 is formed smooth so as to have a larger diameter than the inner diameter of the protrusions 91*a*, and the outer diameter of the enlarged outer diameter portion 55 of the bypass valve element 51 is formed so as to come into sliding contact with the inner surface of the rear portion of the cylindrical body 91 having the larger inner diameter. The piston receiving member 53 is formed in such manner that its outer circumference may come into contact with the inner circumference of the enlarged outer diameter portion 55, its front end may come into contact with the rear end of the bypass valve element 51, and its inner circumference may come into sliding contact with the enlarged diameter portion 4*c* of the piston 40.

As shown in FIG. 1(B), the piston 40 is provided in an axially movable manner penetrating through the bypass opening and closing body 50 along its center line with O-rings for preventing leakage interposed therebetween. The front end of the piston 40 butts against the main valve element 20 at a position of a predetermined degree of opening of the main valve element 20, the rear end portion of the piston 40 is formed to have a length such that the rear end portion can slide within an adjusting member 60, and a protrusion 4*b* is formed in the middle of the piston 40 so that upward movement of the piston 40 as viewed in FIG. 1(B) may be stopped at a predetermined position by the protrusion 4*b* butting against the inner top surface of the bypass valve element 51. In the rear portion of the piston 40 is formed the enlarged outer diameter portion 4*c*. This enlarged outer diameter portion 4*c* fits in the piston receiving member 53 of the bypass opening and closing body 50 and penetrates therethrough, and the end portion of the enlarged outer diameter portion 4c fits in the adjusting member 60. In addition, a communication hole 4a axially penetrating the piston 40 is formed along a center line of the piston 40.

As seen in FIG. 1(B), in the rear end portion of the bypass valve section (the lower end portion of FIG. 1(B)) is provided the adjusting member 60 in an axially movable manner along the center line of the bypass valve section, with its outer peripheral surface supported by the adjusting member support 93 within the lid 15 fastened to a valve box 10 by means of the mounting bolts 16. A space formed between the front end surfaces of the adjusting member support 93 and the adjusting member 60 and the rear end surface of the enlarged outer diameter portion 55 of the bypass opening and closing body 50 is a control chamber 9*c*. In addition, in a threaded hole formed along the center line of the lid 15 is screwed in an adjusting bolt 65, and this adjusting bolt 65 is adapted to set the position in the axial direction position of the adjusting member 60 by adjustably pushing the adjusting member 60 via the threads. Also, stopper screws 71 and 72 are screwed in the lid 15. If the tip ends of the stopper screws 71 and 72 are projected from the front end surface of the adjusting member support 93, then when the bypass opening and closing body 50 has moved downwards as viewed in FIG. 1(B), the tip ends would butt against the rear end surface of the enlarged outer diameter portion 55 so that the degree of opening of the bypass opening and closing body 50 may be adjustably restrained.

In FIG. 1(B), the structure is constructed in such a manner that uniform narrow gap spaces may be formed respectively between the inner circumferential surface of the adjusting member 60 and the enlarged outer diameter portion 4*c* of the piston 40 and between the inner circumferential surface of the piston receiving member 53 and the enlarged outer diameter portion 4*c*. More particularly, the construction is such that, due to a flow resistance of fluid passing through these gap spaces, the flow rate of the fluid flowing through the gap space between the outer surface of the enlarged outer diameter portion 4*c* and the inner surface of the adjusting member 60 into the control chamber 9*c*, and the flow rate of the fluid flowing from the control chamber 9*c* through the gap space between the outer surface of the enlarged outer diameter portion 4*c* and the inner surface of the piston receiving member 53 and leaking into the bypass outlet 1*b*, may be a leakage flow rate nearly inversely proportional to the overlapping length in the axial direction of the both members, that is, to the axial length of the respective gap spaces.

Figures 3A, 3B:
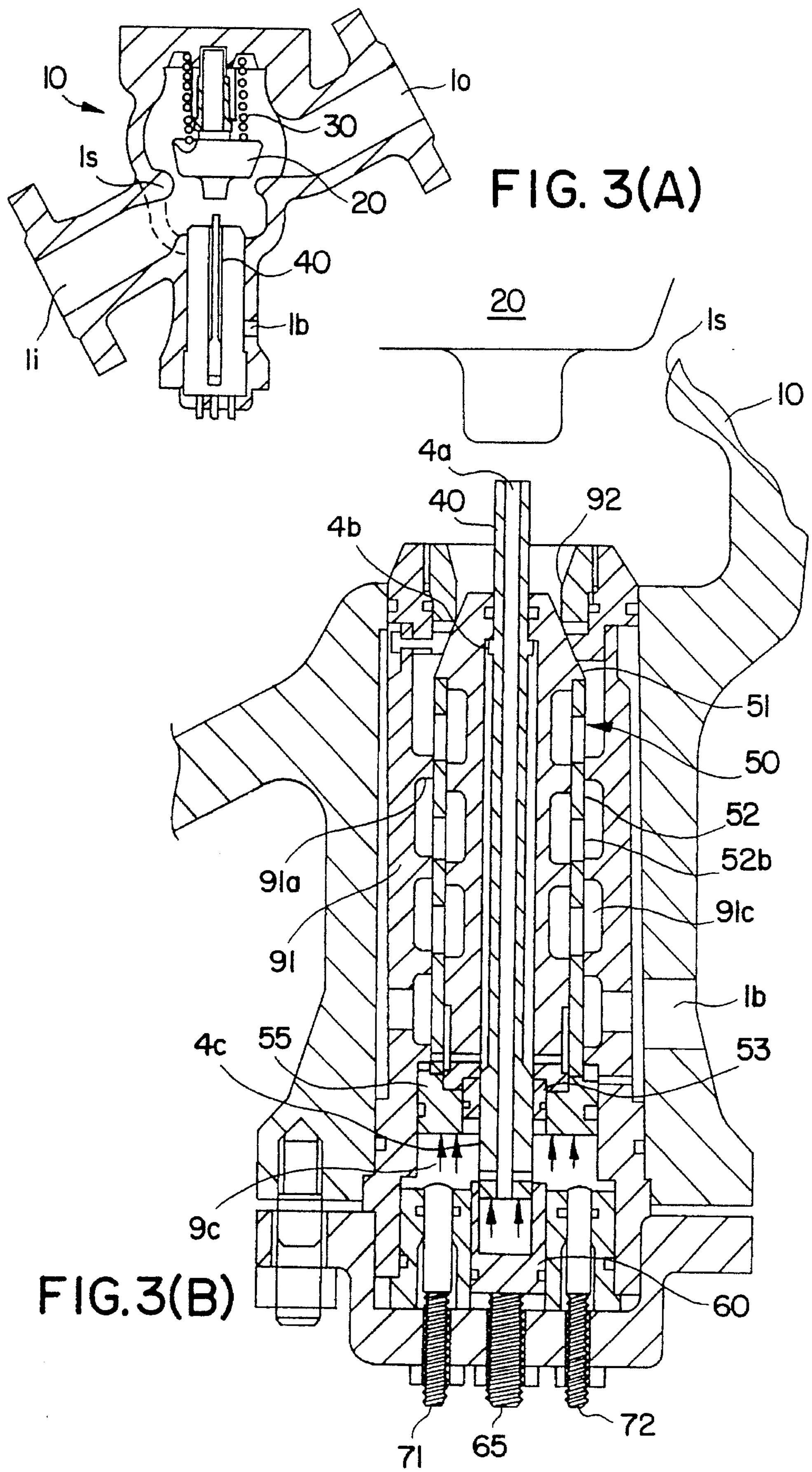
FIGS. 3(A) and 3(B) show a bypass closing state of the flow control valve shown in FIG. 1, with a general vertical cross-sectional view of the flow control valve being shown at FIG. 3(A), and a vertical cross-sectional view of the bypass valve section of the same flow control valve being shown at FIG. 3(B)

Now description will be made of the operation of the flow control valve according to the illustrated embodiment of the present invention. As shown in FIGS. 3, when a load flow rate of fluid flowing out of the outlet 1*o* to a boiler or the like (not shown) is large, the main valve element 20 is pushed up by a pressure of the fluid flowing from a water feed pump or the like (not shown) into the inlet 1*i*, compressing the spring 30. The fluid passes the passage between the main valve element 20 and the main valve seat 1*s* and flows out through the outlet 1*o* to the load. When the flow rate is larger than a predetermined value and hence the main valve element 20 is at a position of a degree of opening larger than a predetermined degree of opening, that is at a position of a degree of opening larger than the value represented by point d in FIG. 6(A), the piston 40 and the bypass opening and closing body 50 are free because the main valve element 20 is separated from the piston 40. In such a case, as shown in FIG. 3(B), since the pressure of the fluid entering into the adjusting member 60 and into the control chamber 9*c* through the communication hole 4*a* penetrating the piston 40 acts upon the rear end surface of the enlarged outer diameter portion 4*c*, which is larger than the front end surface and upon the rear end surface, of the enlarged outer diameter portion 55 of the bypass opening and closing body 50, the piston 40 is pushed up until the protrusion 4*b* thereon butts against the inside top end surface of the bypass valve element 51. In addition the bypass opening and closing body 50 is also pushed up forwards by the fluid pressure acting upon its rear end surface, hence the bypass valve element 51 comes into contact with the bypass valve seat 92, and the bypass flow rate is kept zero. It is to be noted that under this condition, a fitting depth of the enlarged outer diameter portion 4*c* of the piston 40 into the adjusting member 60 is small, within the control chamber 9*c* is present a sufficient amount of pressurized fluid, and since the gap clearance between the piston 40 and the piston receiving member 53 has a certain length, a leakage flow rate from the control chamber 9*c* to the bypass outlet 1*b* is small, and the inside of the control chamber 9*c* is maintained at a high fluid pressure.

Figure 6A:
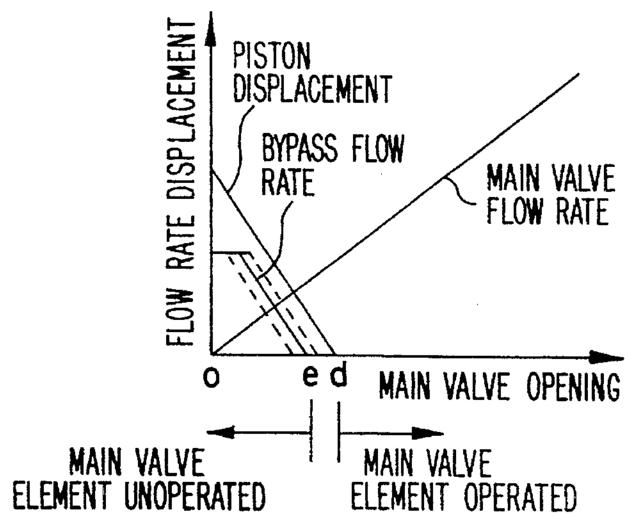
FIGS. 6(A) and 6(B) are diagrams showing the relation between a degree of opening of a main valve and a flow rate, with one diagram showing the relation with respect to a flow control valve as shown in FIG. 1 in FIG. 6(A), and the other diagram showing the same relation with respect to the flow control valve of FIG. 5 in FIG. 6(B).
Figure 6B:
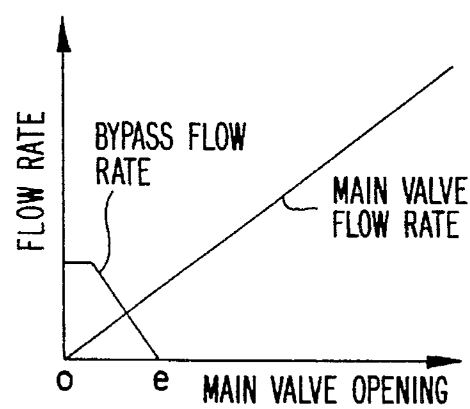

If the load flow rate decreases, and the main valve element 20 comes to a position of a degree of opening smaller than the predetermined degree of opening indicated at point d in FIG. 6(A), then as seen in FIG. 1 the main valve element 20 comes into contact with the piston 40 and depresses the piston 40, and so the fitting depth of the rear end portion of the piston 40 into the adjusting member 60 becomes large. If the degree of opening of the opening position of the main valve element 20 becomes smaller than that of the opening position indicated at point e in FIG. 6(A) and the fitting depth of the piston 40 into the adjusting member 60 becomes larger than a certain extent, then the overlapping distance between the enlarged outer diameter portion 4*c* of the piston 40 and the adjusting member 60 becomes longer, and the flow resistance of fluid between the communication hole 4*a* of the piston 40 and the control chamber 9*c* behind the bypass opening and closing body 50 increases, on the other hand, the length of the gap clearance between the enlarged outer diameter portion 4*c* and the piston receiving member 53 decreases, hence the flow resistance of the fluid is reduced, and the fluid flows out easily from the control chamber 9*c*. Therefore, the pressure in the control chamber 9*c* lowers, and the bypass opening and closing body 50 moves backwards (downward as viewed in the figure). If the bypass opening and closing body 50 moves downwards, the flow rate of the leakage flowing out of the control chamber 9*c* decreases, and therefore, the bypass opening and closing body 50 stops at the position where the flow rate of the fluid flowing out of the control chamber 9*c* balances with the flow rate of the fluid flowing into the control chamber 9*c*.

As described above, in response to a decrease of the degree of opening of the main valve element 20, the fitting depth of the piston 40 into the adjusting member 60 increases. Hence a flow resistance of the fluid flowing into the control chamber 9*c* increases, while a flow resistance of the fluid flowing out of the control chamber 9*c* increases, and therefore the pressure in the control chamber 9*c* lowers, and thus the bypass opening and closing body 50 moves backwards (downwards as viewed in the figure) until a balanced state is established. Thereby the bypass valve element 51 separates from the bypass valve seat 92, and the bypass flow rate increases.

Figure 2:
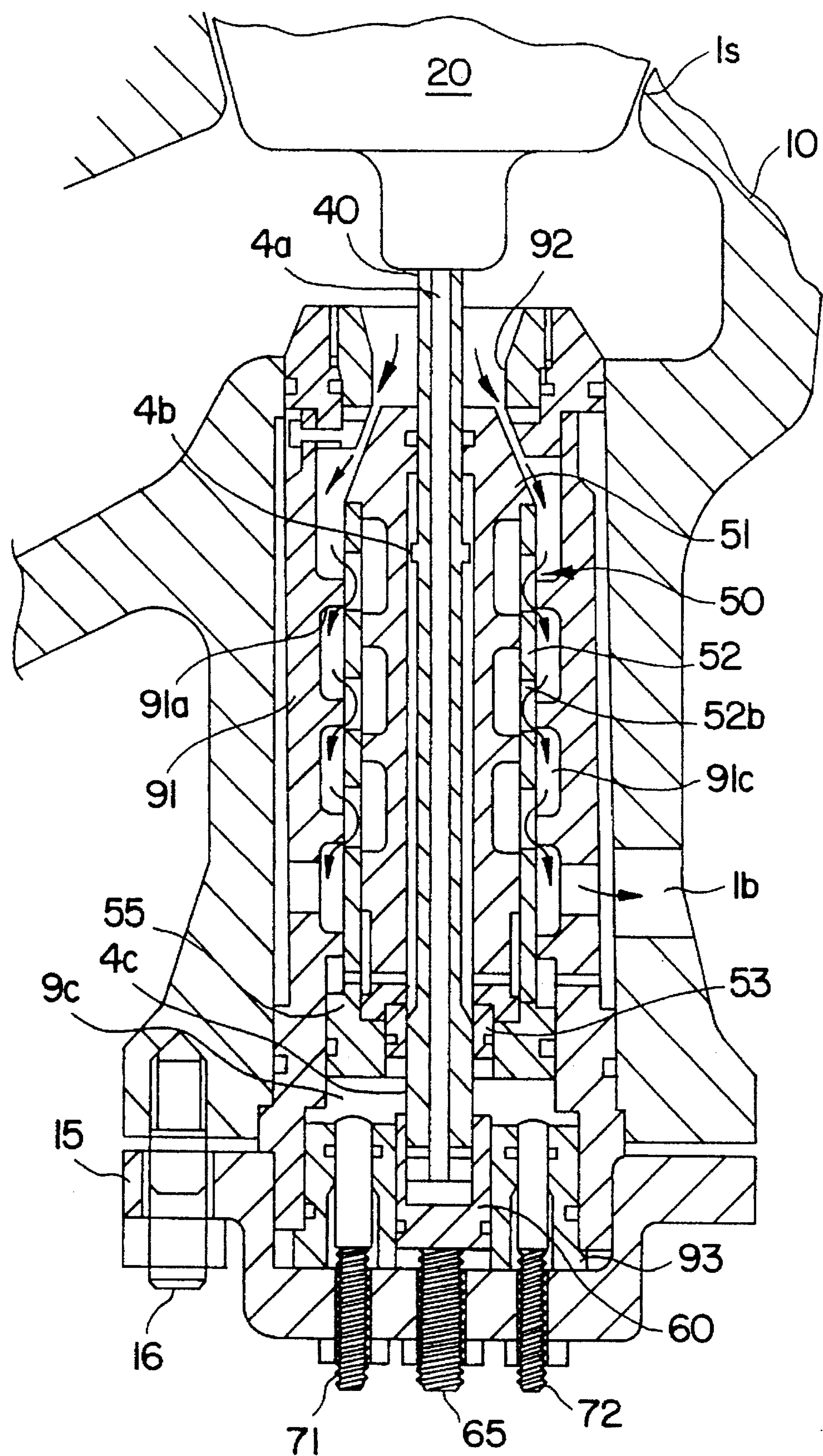
FIG. 2 is a vertical cross-sectional view showing bypass flows in the flow control valve shown in FIG. 1.

Owing to the fact that the respective bypass flow passages 91*c*, partitioned by the plurality of protrusions 91*a* on the cylindrical body 91, are uniformly opened and closed by the respective slot holes 52*b* in the bypass opening and closing body 50 simultaneously with opening and closing of the bypass valve element 51, as best seen in FIGS. 2, the fluid flowing towards the bypass outlet 1*b* would be stepwisely reduced in pressure at the locations of the respective slit holes 52*b*, hence a pressure difference at the time of pressure reduction becomes small, and so, cavitations are generated. Accordingly, the occurrence of corrosion or the like due to cavitation is prevented.

Figure 4A:
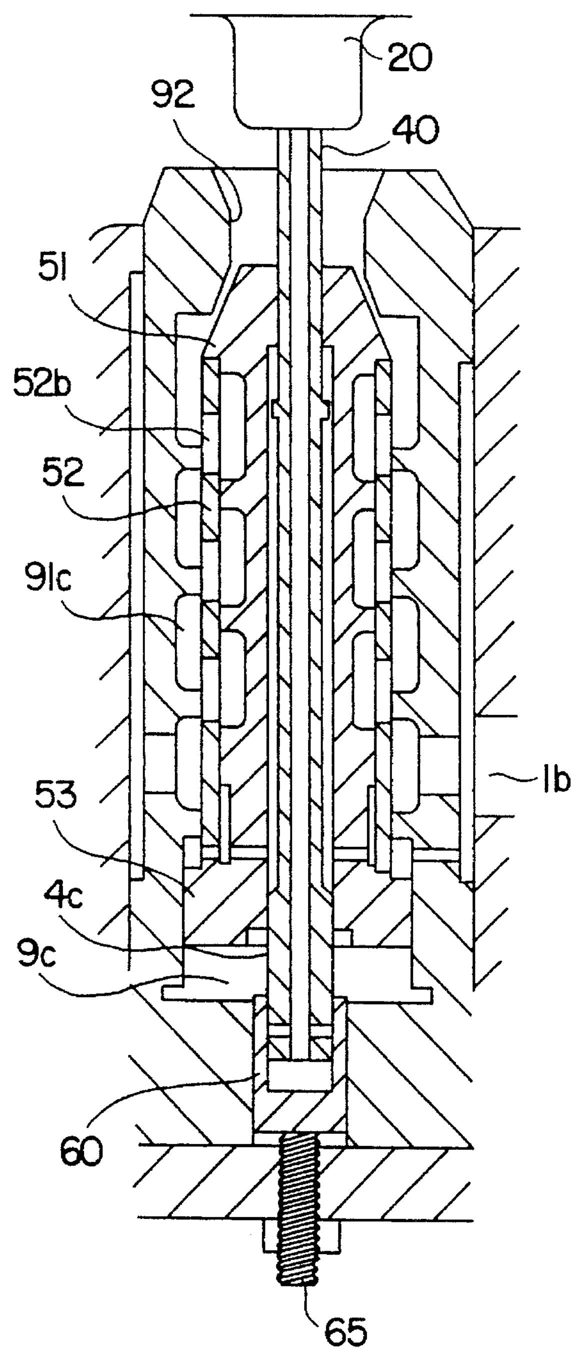
FIGS. 4(A) and 4(B) show operating states of the same flow control valve as shown in FIG. 1 in the event that the setting of a bypass start point has been varied, with a vertical cross-sectional view of the flow control valve under a state where the bypass start point has been retarded being shown at FIG. 4(A), and while a vertical cross-sectional view of the same flow control valve under a state where the bypass start point has been advance being shown at FIG. 4(B)
Figure 4B:
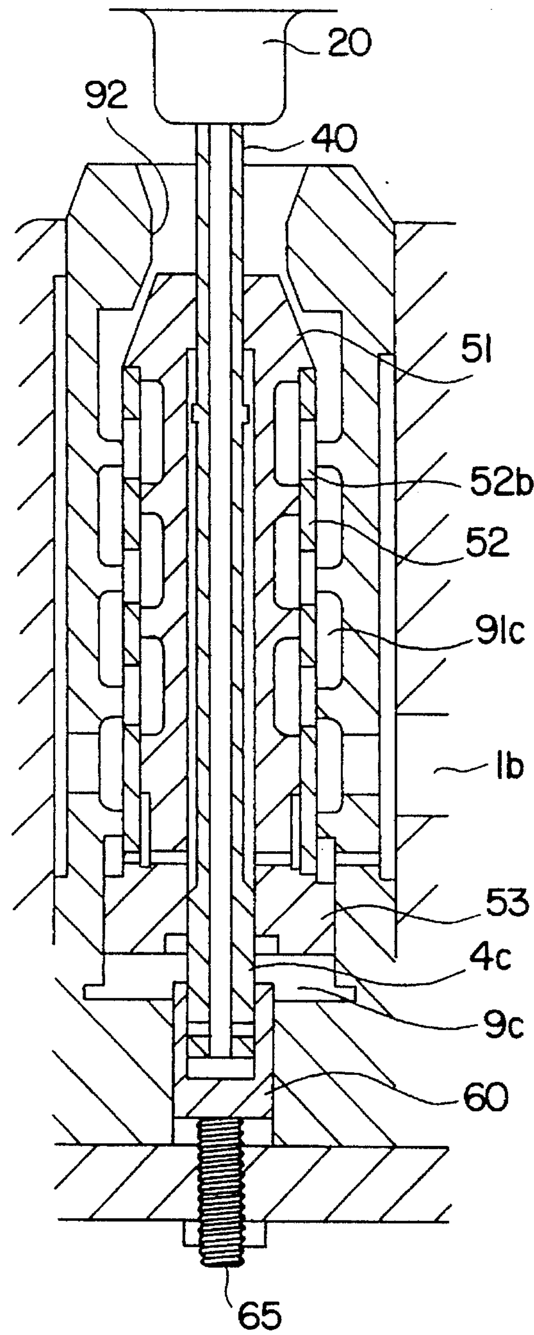
Figure 5:
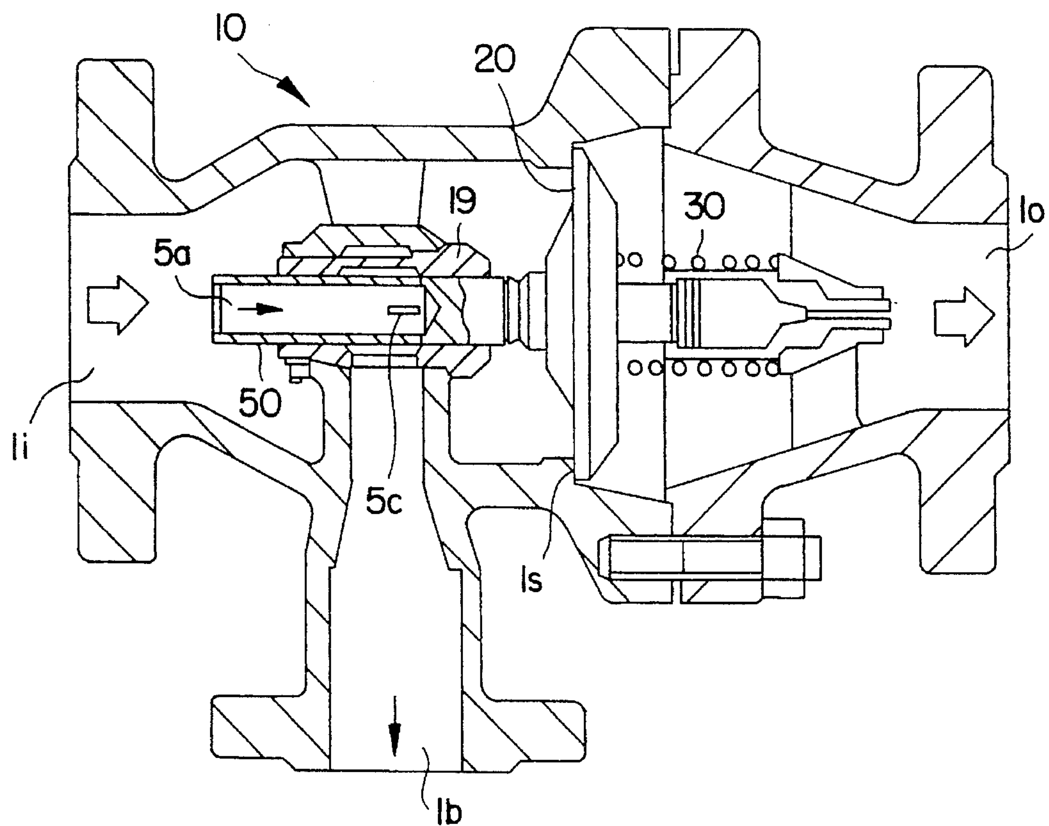
FIG. 5 is a vertical cross-sectional view of a flow control valve in the prior art.

If the position in the axial direction of the adjusting member 60 is lowered by lowering the adjusting bolt 65 as shown in FIG. 4(A), then the fitting depth of the piston 40 into the adjusting member 60 is reduced, and the flow rate of the fluid flowing into the control chamber 9*c* increases. Therefore the bypass opening and closing body 50 would rise so as to make the flow rate of the fluid flowing out of the control chamber 9*c* balance with the increased inflow rate, and so, the bypass flow rate decreases. On the contrary, if the position in the axial direction of the adjusting member 60 is raised by raising the adjusting bolt 65 as shown in FIG. 4(B), then the fitting depth of the piston 40 into the adjusting member 60 is increased, and the flow rate of the fluid flowing into the control chamber 9*c* decreases. Therefore the bypass opening and closing body 50 would lower so as to make the flow rate of the fluid flowing out of the control chamber 9*c* balance with the decreased inflow rate, and so the bypass flow rate increases. Accordingly, in the event that it becomes necessary to change and adjust the bypass start point or the like after the flow control valve is installed in a plant or the like, the bypass start point or the like can be easily changed and adjusted by changing and adjusting the position in the axial direction of the adjusting member 60 by turning the adjusting bolt 65.

Furthermore, if stopper screws 71 and 72 are provided at the rear end portion of the bypass valve section, the full open position of the bypass opening and closing body 50 can be adjustably restrained, and so the bypass flow rate at the full open state can be adjustably restrained.

As seen from the detailed description of one preferred embodiment of the present invention above, according to the present invention, since a displacement of a piston is converted into a displacement of a bypass opening and closing body via an adjusting member, even after the flow control valve is installed, the bypass start point or the like can be easily adjustably set by adjustably setting the position of the adjusting member. Furthermore, since the bypass flow is stepwisely reduced in pressure by means of a plurality of slit holes, a pressure difference at the time of pressure reduction becomes small, hence cavitations hardly occur, and the generation of damage such as corrosion can be prevented. In addition, if stopper screws are provided, a maximum bypass flow rate can be easily variably set.

While a principle of the present invention has been described above in connection to one preferred embodiment of the invention, it is intended that all matter described in the specification and illustrated in the accompanying drawings shall be interpreted to be illustrative and not in a limiting sense.

What is claimed is:

1. A flow control valve comprising:

a valve housing having a main valve section comprising an inlet, an outlet, a main valve seat between said inlet and said outlet and a main valve element engageable with said main valve seat, and a bypass valve section;

a cylindrical body in said bypass valve section, said cylindrical body having an inner peripheral surface, a bypass valve seat thereon and a plurality of protrusions on said inner peripheral surface forming bypass flow passages therebetween;

a bypass opening and closing body disposed in an axially movable manner in said cylindrical body, said bypass opening and closing body having an outer peripheral surface, a first portion, a bypass valve element on said first portion adapted to butt against said bypass valve seat, a plurality of holes on said outer peripheral surface for opening and closing said bypass flow passages between said protrusions on said inner peripheral surface of said cylindrical body simultaneously with opening and closing of said bypass valve element, and a second portion having an enlarged outer diameter section in contact with said inner peripheral surface of said cylindrical body;

a piston disposed in said bypass opening and closing body in an axially movable manner and extending through said bypass opening and closing body, said piston having a rear portion with an enlarged outer diameter section and a communication hole extending axially through said piston;

a control chamber defined in said bypass valve section adjacent to said second portion of said bypass opening and closing body;

an adjusting means for receiving said rear portion of said piston and applying a resistance force to the flow of fluid between said communication hole in said piston and said control chamber in dependence upon the depth of penetration of said rear portion of said piston therein; and an adjustment setting means accessible from outside of said valve housing for variably setting an axial position of said adjusting means.

2. The flow control valve of claim 1, wherein said bypass opening and closing body has a collar thereon forming said holes.

3. The flow control valve of claim 1, and further comprising an adjustable stopper in said bypass valve section for adjustably setting a full open position of said bypass opening and closing body.

4. The flow control valve of claim 1, wherein said adjusting means comprise a member mounted in said bypass valve section adjacent to said second portion of said bypass opening and closing body, said member having an interior space receiving said rear portion of said piston with a fluid channel extending between said rear portion and said member so as to fluidly communicate said interior space with said control space.

5. A flow control valve comprising:

a valve housing comprising a main valve section comprising an inlet, an outlet, a main valve seat between said inlet and said outlet and a main valve element engageable with said main valve seat, and a bypass valve section having a bypass outlet;

a cylindrical body fixed in said bypass valve section, said cylindrical body having an inner peripheral surface, a bypass valve seat thereon between said main valve and said bypass outlet, and a plurality of protrusions on said inner peripheral surface forming bypass flow passages therebetween, said bypass outlet being in communication with one of said bypass flow passages;

a bypass opening and closing body disposed in an axially movable manner in said cylindrical body, said bypass opening and closing body having an outer peripheral surface slidable against said protrusions of said cylindrical body, a front end portion, a bypass valve element on said front end portion adapted to butt against said bypass valve seat, a plurality of holes in said outer peripheral surface, a rear end portion having an enlarged outer diameter section in slidable contact with said inner peripheral surface of said cylindrical body, and an interior peripheral surface;

a first fluid channel defined by said cylindrical body and said bypass opening and closing body communicating said interior peripheral surface of said bypass opening and closing body with said bypass outlet;

a piston disposed in said bypass opening and closing body in an axially movable manner and extending through said bypass opening and closing body, said piston having a rear portion with an enlarged outer diameter section in slidable contact with said interior peripheral surface of said bypass opening and closing body and a communication hole extending axially through said piston;

a control chamber defined in said bypass valve section adjacent to said rear end portion of said bypass opening and closing body;

a second fluid channel defined between said rear portion of said piston and said interior peripheral surface of said bypass opening and closing body communicating said control chamber with said first fluid channel;

an adjusting member mounted in said bypass valve section having an interior receiving said rear portion of said piston wherein said communication hole in said piston communicates said interior of said adjusting member with said main valve section;

a third fluid channel communicating said interior of said adjusting member with said control chamber; and an adjustment member extending from outside of said valve housing into said bypass valve section into contact with said adjusting member for axial adjustment of the position thereof.

6. The flow control valve of claim 5, wherein said rear portion of said piston and said interior peripheral surface of said bypass opening and closing body have a variable contact length variable by movement of said piston relative to said bypass opening and closing body for varying the fluid resistance of said second fluid channel.

7. The flow control valve of claim 5, wherein said rear portion of said piston and said interior of said adjusting member have a variable contact length variable by movement of said piston relative to said adjusting member for varying the fluid resistance of said third fluid channel.

8. The flow control valve of claim 5, and further comprising an adjustable stopper in said bypass valve section for adjustably setting a full open position of said bypass opening and closing body.

* * * * *